United States Patent [19]

Swift et al.

[11] Patent Number: 4,861,489

[45] Date of Patent: Aug. 29, 1989

[54] WATER RECIRCULATING APPARATUS AND METHOD

[75] Inventors: Thomas R. Swift, London; Dennis H. Desty, Walton-On-Thames, both of England

[73] Assignee: Safety First Limited, London, England

[21] Appl. No.: 67,776

[22] Filed: Jun. 1, 1987

[30] Foreign Application Priority Data

Oct. 1, 1985 [GB] United Kingdom ................. 8524155

[51] Int. Cl.[4] .............................................. B01D 15/00

[52] U.S. Cl. .................................... 210/668; 210/669; 210/764; 210/167; 210/181; 422/28; 422/29
[58] Field of Search ............... 210/668, 669, 748, 764, 210/167, 181, 192; 422/29, 28

[56] References Cited

U.S. PATENT DOCUMENTS

| | | | |
|---|---|---|---|
| 2,657,179 | 10/1953 | Robinson | 210/23 |
| 3,382,171 | 5/1968 | Mussel et al. | 210/62 |
| 3,754,741 | 8/1973 | Whitehurst | 261/DIG. 11 |
| 4,198,296 | 4/1980 | Doumas et al. | 210/668 |
| 4,259,269 | 3/1981 | Flowers | 261/DIG. 11 |
| 4,295,343 | 10/1981 | Izumi | 62/309 |
| 4,301,861 | 11/1981 | Larinoff | 261/DIG. 11 |
| 4,525,253 | 6/1985 | Hayes | 204/149 |
| 4,595,498 | 1/1986 | Cohen et al. | 210/192 |

FOREIGN PATENT DOCUMENTS

| | | | |
|---|---|---|---|
| 527961 | 4/1954 | Belgium . | |
| 0114364 | 8/1984 | European Pat. Off. . | |
| 1517512 | 12/1969 | Fed. Rep. of Germany . | |
| 2847339 | 5/1980 | Fed. Rep. of Germany | 210/192 |
| 3406831 | 8/1985 | Fed. Rep. of Germany . | |

OTHER PUBLICATIONS

WO 82/03381 published 10/14/82 Medidren.

*Primary Examiner*—Bernard Nozick
*Attorney, Agent, or Firm*—Lowe, Price, LeBlanc, Becker & Shur

[57] ABSTRACT

A water recirculating system is which (a) water is continuously re-circulated through the system for the prime purpose of causing evaporation from the circulating water: and (b) such water is caused during its flow through an open part of said system through which part atmospheric air may flow to impinge on one or more solid surfaces whereby to increase the free water surface area available for evaporation and at a speed sufficient to release small water droplets from the water flow into the surrounding atmosphere. The system includes in serial relation with the water flow path a decontamination means (64) which comprises a chamber through which the circulating water may flow and in which there is provided an ion releasing means (80,82) for releasing metal ions particularly of silver, copper and zinc into water flowing through said chamber at a release rate sufficient to produce in said flowing water a concentration of such ions sufficient to kill or render innocuous preselected kinds of respiratory disease causing bacterial (particularly Legionella Pneumophila) and other organisms present in said water.

29 Claims, 4 Drawing Sheets

WATER RECIRCULATING APPARATUS AND METHOD

TECHNICAL FIELD

This invention relates to water recirculating apparatus, and to a means for and a method of controlling the dissemination by such apparatus of bacteria and other organisms which give rise to respiratory diseases in human beings.

BACKGROUND ART

The art of preventing or reducing the occurrence of disease caused by bacteria and other organisms which are ingested into the alimentary canal of human beings is well developed, and the toxic effects of certain metal ions carried in suspension in water are known in this connection.

Whilst there has been considerable investigation into the germicidal properties of electrolised silver ions carried in suspension in water, such investigation has been directed towards the development of systems for purifying drinking water, or water that is otherwise likely to be ingested into the human stomach, e.g. swimming pool water. Thus, work done so far has concentrated on the effects of silver ions on coliform bacteria concentrations which arise from faecal contamination of water.

Our researches have established that silver ions carried in suspension in water in appropriate concentrations are effective to kill or otherwise render innocuous bacteria and other organisms that cause respiratory diseases in human beings. Such bacteria include, inter alia, those known as *Legionella Pneumophila,* and their relatives, which bacteria cause the newly-recognised respiratory disease known as Legionaires Disease.

That disease of the human body is particularly hazardous to elderly people, and to sick people, and is caused by the penetration of the bacteria, *Legionnaire Pneumophila,* deep within the passageways of the human lungs, into the alveoli, where they multiply, and also gain access to the bloodstream via the fine blood vessels that line the walls of the alveoli for the purpose of receiving oxygen from air breathed into the lungs. The passageways (bronchial tubes and bronchioles) which communicate with the alveoli are lined with mucus.

We have established that the bacteria *Legionella Pneumophila* have the following characteristics:

(a) they survive only in a water environment;
(b) they die if deprived of that environment;
(c) they can be taken into the human alimentary canal and will pass therethrough without causing any harm;
(d) they give rise to Legionnaire's disease by gaining access to and multiplying in the small air sacs (alveoli) in the lungs, in which sacs the normal process of oxygenation of the blood occurs;
(e) they can enter the human bloodstream via the blood vessels which line the alveoli, and be carried in the bloodstream to other parts of the body where they do harm;
(f) they are impeded by the mucus which lines the air passages (bronchial tubes and bronchioles) which lead to the alveoli; and
(g) they can enter the alveoli only by being carried in very small droplets of water (less than 10 microns in diameter) which are small enough to pass through the passages leading to the alveoli without colliding with and being absorbed into the mucus lining those passages.

Metal ions can be conveniently introduced into water by passing it through an ionising chamber in which a pair of metal or metal alloy electrodes are spaced apart and energised by a suitable alternating or uni-directional electrical potential.

It has been found that water having silver ions so introduced in concentrations of less than one part in ten million parts of water (by wt) constitutes a lethal environment for respiratory disease causing bacteria such as *Legionella Pneumophila.* It has also been found that water having ions of copper or zinc so introduced in concentrations of less than one part per million parts of water (by wt) constitutes a lethal environment for photo-synthesising and other organisms which assist in the development of *Legionella Pneumophila.* The combined effect of the two ion types inhibits the growth of bacteria and other organisms which give rise to Pontiac and Humidifier fevers.

Respiratory diseases most frequently arise from the direct invasion of the lungs by the relevant organisms carried in inhaled breath.

Certain types of apparatus which employ water as a working fluid medium provide an advantageous environment for the multiplication of such respiratory disease causing organisms, and moreover provide a means of disseminating such organisms into the atmospheric air. Such apparatus have the following characteristics:

(a) they each incorporate a water recirculation system in which water is continuously recirculated, with the losses being made up by the admission of make-up water;
(b) they each include an air exposure zone through which the circulating water passes in direct contact with atmospheric air; and
(c) in that zone the water impinges on one or more solid surfaces, which surfaces may be stationary or moving, at an impact velocity that is large enough to cause small water droplets (of sizes down to three microns diameter) to be ejected from the water into the atmospheric air.

Such water recirculating apparatus include the following:

(1) fountains and artificial waterfalls, both indoors and outdoors;
(2) water cooling apparatus in which evaporation of the continuously recirculated water is used to provide cooling of the circulated water; and
(3) air humidifying apparatus in which evaporation of the continuously recirculated water is used to humidify a flow of atmospheric air.

In such water cooling apparatus of the kind referred to at (2) above, the recirculated water also passes through a heat source whereby to extract heat therefrom. As an example, such a heat source may comprise a heat exchanger of a refrigeration unit, which unit may itself comprise part of an air conditioning plant, for example for a building. Alternatively, the heat source may comprise a steam condenser as used for example in conjunction with a steam driven electric power generation plant, the circulated water being passed through the cooling water circuit of the steam condenser.

In each of those two applications, the recirculated water absorbs heat from the heat source, and is itself cooled by evaporation in an atmospheric air flow in said air exposure zone, before being recirculated to absorb further waste heat from the heat source.

In such applications, the pipework for carrying the circulating water from the heat source to the said air exposure zone works at temperatures that are particularly conducive to the multiplication of such respiratory disease causing organisms. Such organisms thus colonise the interior of that pipework, and moreover travel with the water leaving that pipework, so that they can escape into the atmospheric air flowing in said air exposure zone.

Thus, there is a high risk that water entering the said air exposure zone will carry into it *Legionella Pneumophila* bacteria, and also other bacteria and organisms (such as protozoa, algae, and slime moulds—with which organisms the bacteria *Legionella Pneumophila* symbiotically associate) that also colonise those warm pipework parts and travel in the water leaving that pipework.

Likewise, there is a high risk that *Legionnaire Pneumophila* bacteria, in particular, will be emitted from such zone in water droplets that are carried away in the exiting atmospheric air flow, and that many of such droplets are of, or will evaporate down to, the aforesaid small size at which they are able to penetrate the alveoli of people who breathe in atmospheric air coming from the exit ducts of such apparatus.

Similarly, other water droplets of appropriate size may carry away from said zone other bacteria and organisms which can give rise to Pontiac fever and/or Humidifier fever in those persons who inhale those water droplets present in humidified atmospheric air leaving said zone.

In many present day water re-circulating apparatus which have been used to cool the circulating water by evaporation in the air exposure zone, reliance has been placed upon the injection of toxic chemicals (such as chlorine and its compounds, and more recently and expensively, ozone) into the circulating water in order to control and limit the growth of bacteria (and organisms which may aid their growth) and of organisms which by their clogging effect may tend to impede the operation of the overall system.

Such chemicals give rise to additional expense, and also problems in their use, since they can evaporate, degrade on contact with sunlight and organic material, and being sometimes highly reactive attack the pipework and mechanisms of the system. Such expense arises from the costs of providing the chemicals and the means for injecting them automatically, and the additional maintenance that arises from their use. If manual injection is relied upon, there is the additional hazard of infection in the event that the injection timetable is not strictly adhered to.

A further problem arises in that hazardous chemicals will be present in the bleed-off water, which may find its way into a variety of collection points from which water intended for human or animal use is obtained.

Because of the difficulties which arise from the use of toxic chemicals to prevent the growth of undesirable bacteria and other organisms, there has been a move away from the use of such evaporative water cooling systems in relation to air conditioning systems for buildings, in favour of alternative, more expensive water cooling systems in which the water to be cooled is passed through a heat exchanger which comprises an enclosed water circuit over which atmospheric air is blown so as to cool the water flowing through that circuit. In such systems the water has no opportunity to come into direct contact with the atmospheric air so that no air-borne, bacteria-carrying water droplets can be formed.

In air humidifiers of the kind referred to at (3) above, there is a similar risk of disseminating in an atmospheric air flow respiratory disease producing bacteria and other organisms carried in small water droplets. Such humidifiers may be of the kind in which evaporation takes place in water falling freely over slats or baffles, or of the kind in which a stream of water is caused to impinge on the surface of a spinning disc whereby to break up the water flow into a series of small water droplets.

The present invention seeks to provide a means for a method of reducing the infectivity of the unwanted but unavoidable small water droplets present in the output air flow of such water recirculating apparatus, which means and method do not rely on the injection of toxic chemicals to control the growth of undesirable bacteria and other organisms in the circulating water.

We are aware of a prior proposal (see U.S. Pat. No. 4,525,253—Hayes et al, published 25.6.85) to use, in a water purifying means for a swimming pool or other water reservoir, a metal ion release means for simultaneously releasing ions of silver, copper and nickel from similar, metal alloy electrodes, in an endeavour to kill coliform bacteria and render that body of water potable, the water being circulated for that purpose from the reservoir to an external purifying device and back to the reservoir solely for effecting the desired purification.

DISCLOSURE OF THE INVENTION

According to the present invention there is provided a water recirculating apparatus comprising:
(a) a water discharge means for discharging water into an evaporation zone through which atmospheric air may flow in contact with the water whereby to effect evaporation therefrom;
(b) means for breaking up the discharging water flow whereby to increase the free surface area of the water available for evaporation;
(c) means for causing a said flow of atmospheric air through said zone;
(d) collection means for collecting unevaporated water exiting from said zone;
(e) duct means interconnecting the collection means and the discharge means;
(f) pump means connected in the duct means for returning water from the collecting means through the duct means to the discharge means; and
(g) a decontaminating means connected in that part of the apparatus comprising the duct means and the discharge means for introducing into the water flowing therethrough metal ions at a release rate sufficient to produce in the flowing water a predetermined concentration of metal ions sufficient to kill preselected kinds of respiratory disease causing bacteria and other organisms present in the flowing water.

Preferably, the decontaminating means is connected upstream of and adjacent to the discharge means.

Where the duct means includes a main duct and an auxiliary duct arranged in parallel relationship with the main duct, the decontaminating means may be connected in either or both of the main and auxiliary ducts.

The duct means may comprise a metal duct means.

The ion releasing means may be arranged to release into said flowing water ions of silver, and if desired copper or zinc.

Preferably, the ion releasing means comprises a chamber connected in serial manner in the duct means, at least one pair of opposed, metal electrode systems spaced apart in the chamber, and means for developing a uni-directional or an oscillating electric potential therebetween.

The apparatus may include a make-up water pipe for supplying make-up water to the apparatus, and disposed in serial relation with the make-up water pipe, a means for removing phosphates, sulphides, and/or chlorides from make-up water flowing therethrough into the apparatus.

Each of the means for removing phosphates, sulphides or chlorides from make-up water flowing therethrough preferably comprises an ion exchange column which incorporates beads of a suitable ion exchange resin.

Preferably, where the ion releasing means is connected in the duct means, the duct means includes downstream of the ion releasing means an ion exchange column which incorporates ion exchange resin beads of a pore size suitable for holding released metal ions in readiness for their attachment to bacteria or other organisms present in the water flowing through that column.

Preferably, the apparatus includes automatic monitoring and control means for monitoring and maintaining automatically at a predetermined value the pH value of the water circulating in the apparatus.

In one application of an apparatus according to the present invention, a heat source is connected in the duct means, and heat is extracted from the heat source by the water flowing through the duct means, and that heat is dissipated from the water by evaporation therefrom in the evaporation zone. The heat source may comprise a heat exchanger which forms part of a refrigeration unit, which unit in turn may constitute part of an air conditioning unit, for example, for a building.

In another application of an apparatus according to the present invention, such a heat source may comprise a steam condensing unit, for example, for a steam powered generating station.

The means for breaking up the discharging water may comprise an impingement surface means against which the discharging water is caused to impinge. Such impingement surface means may comprise a series of vertically-spaced, overlapping, stationary baffles on to which the discharging water successively impinges. Alternatively, the impingement means may comprise a rotating disc on to the moving surface of which the discharging water flow is caused to impinge.

The present invention also provides a method of operating a water recirculating apparatus.

One evaporative, water recirculating apparatus, and various modified forms thereof, all according to the present invention will now be described by way of example and with reference to the accompanying diagrammatic drawings.

MODES OF CARRYING OUT THE INVENTION

Figure 1:
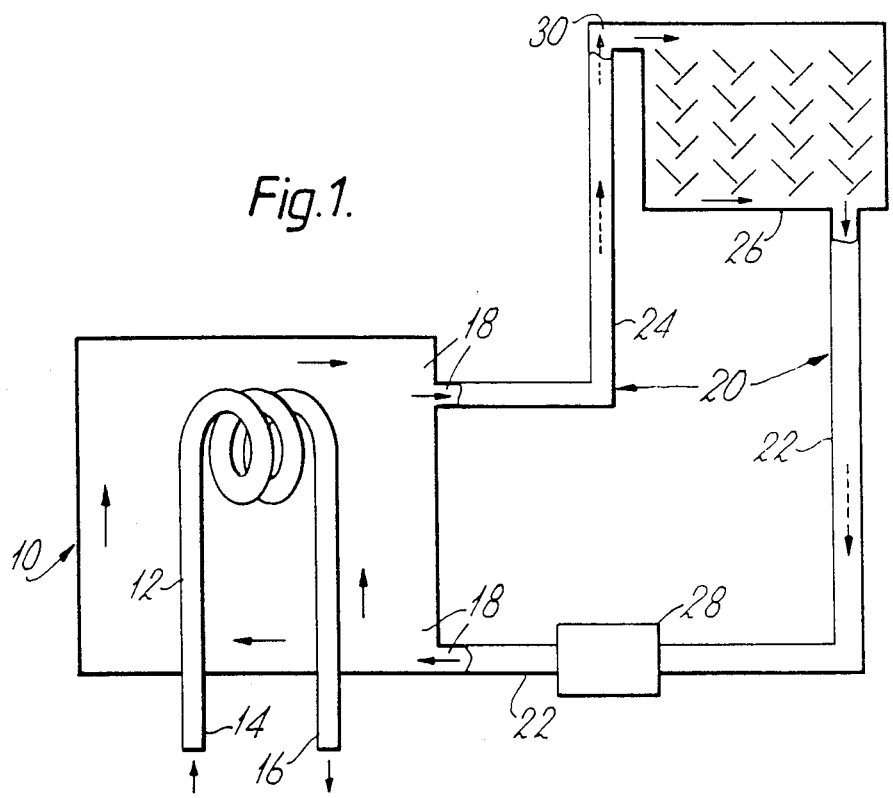
FIG. 1 shows schematically the arrangement of the principal components constituting a typical prior art, water recirculating, evaporative cooling apparatus to which the present invention may be advantageously applied.

Referring now to the drawings:

FIG. 1 depicts the schematic arrangement of a typical water recirculating, evaporative cooling apparatus to which the present invention may be advantageously applied. In that apparatus, a heat exchanger 10 (i.e. a heat source) has a primary or heat input flow circuit 12 which is connected at 14, 16 to receive hot water (or other liquid) from an independent heat source, e.g. a steam turbine condenser (not shown), and a secondary or cooling water flow circuit 18 which is connected in a closed water circulation system 20. That system includes pipework 22, 24 which connects in serial relationship the heat exchanger 10, an evaporative type water cooling unit 26, and a circulation pump 28 for returning water exiting from the water cooling unit to the heat exchanger secondary circuit 18, and thence to a discharge means 30 for discharging it again into the upper part of the water cooling unit 26.

Heat received by the circulating cooling water as it passes through the secondary circuit 18 of the heat exchanger 10 is dissipated in the cooling unit 26 by evaporation from the free surfaces of that cooling water when exposed in the atmospheric air that is caused to flow through the cooling unit.

The cooling unit 26 may take any convenient form. For example, it may comprise a cooling tower of the kind shown in FIG. 2, in which the hot water feed pipe 30 discharges hot water into the top of a rectangular tower structure 32 through a series of discharge nozzles 34 (one only being shown) on to a plurality of arrays 36 of vertically-spaced, mutually-inclined slats or baffles. For the sake of simplicity, only one such array is shown, and that is seen in end view.

The tower structure has apertured side walls 38, 40 through which a transverse flow of atmospheric air 42 is formed by one or more motor driven fans 44. The flow of water discharged into the top of the tower is broken up as it descends, so as to increase its free surface area available for evaporation, by impingement on successive, oppositely-directed baffles 46. Small droplets of water are released into the atmospheric air flow, on impingement of the descending water on successive baffles, along with water vapour evaporated from the descending water.

The unevaporated water 48 leaving the lowermost baffles falls into a collector tray 50 from which it exits through the pipework 22 to the pump 28.

Figure 3:
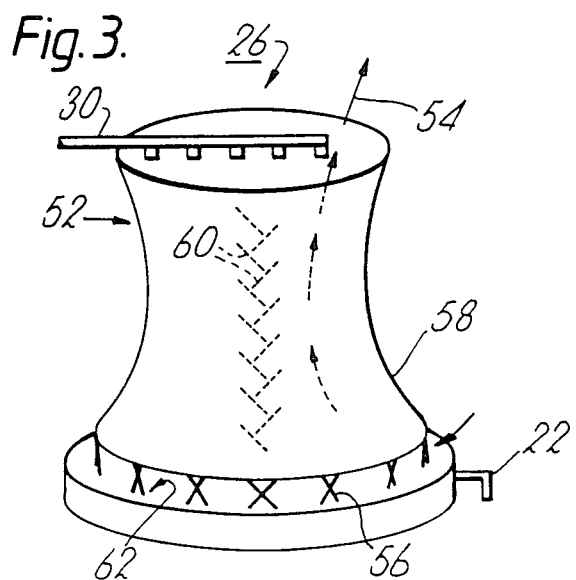
FIG. 3 shows schematically the arrangement of the principal components of a prior art water cooling tower of the induced-draught, evaporative type, in which a vertical flow of atmospheric air is thermally induced in a vertical, venturi-shaped tower.

Alternatively, the cooling unit 26 may comprise a conventional venturi-shaped concrete tower 52 of the kind illustrated in the FIG. 3, and commonly seen in association with steam-powered, electric power generating stations. In such a tower, the thermally-induced atmospheric air flow 54 is directed vertically upwards, having entered between the legs 56 which support the tower shell 58, and flowing away at the top of the shell. That upward air flow runs counter to the downward flow of water that is being discharged into the tower at the top (or at an intermediate height) from the discharge means 30.

The downward flow of hot water is broken up (as in the case of the cooling tower shown in the FIG. 2) by a plurality of arrays of vertically-spaced, oppositely directed slats or baffles 60. Again, in addition to the release of water vapour into the upward flow of atmospheric air, each impingement of the water flow onto a next baffle 60 releases small water droplets into that air flow. The tower shell 58 stands above a collection pond 62 into which unevaporated water falls and from which it is drawn, by the pump 28, through the pipework 22 for recirculation through the secondary flow circuit 12 of a steam condensing unit 10 of a steam turbine (not shown), and thence to the multi-nozzled discharge means 30 at the top of the cooling tower.

Figure 2:
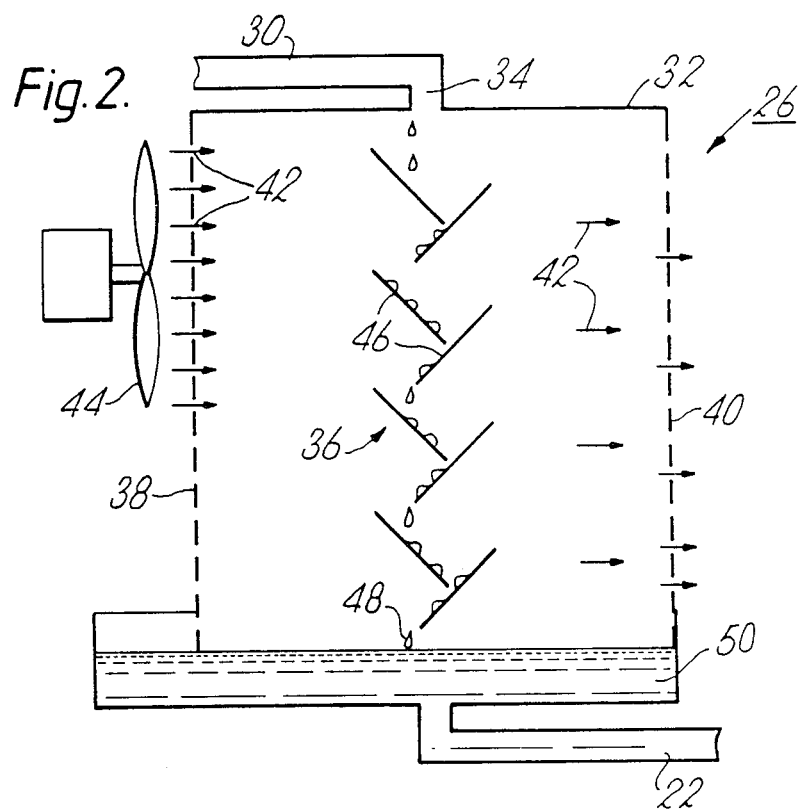
FIG. 2 shows schematically the arrangement of the principal components of a prior art water cooling tower of the forced-draught, evaporative type, in which a transverse flow of atmospheric air is provided by a motor-driven fan.

The apparatus according to the present invention comprises in one particular form (a) a recirculating, evaporative water cooling apparatus as described with reference to the FIG. 1, and the associated FIG. 2 or FIG. 3, and (b) certain additional items which will now be referred to in connection with the apparatus shown in the FIG. 4. In that figure, components which have counterparts in the FIGS. 1 to 3 bear the respective reference numbers assigned to the respective counterparts in those earlier figures.

Figure 4:
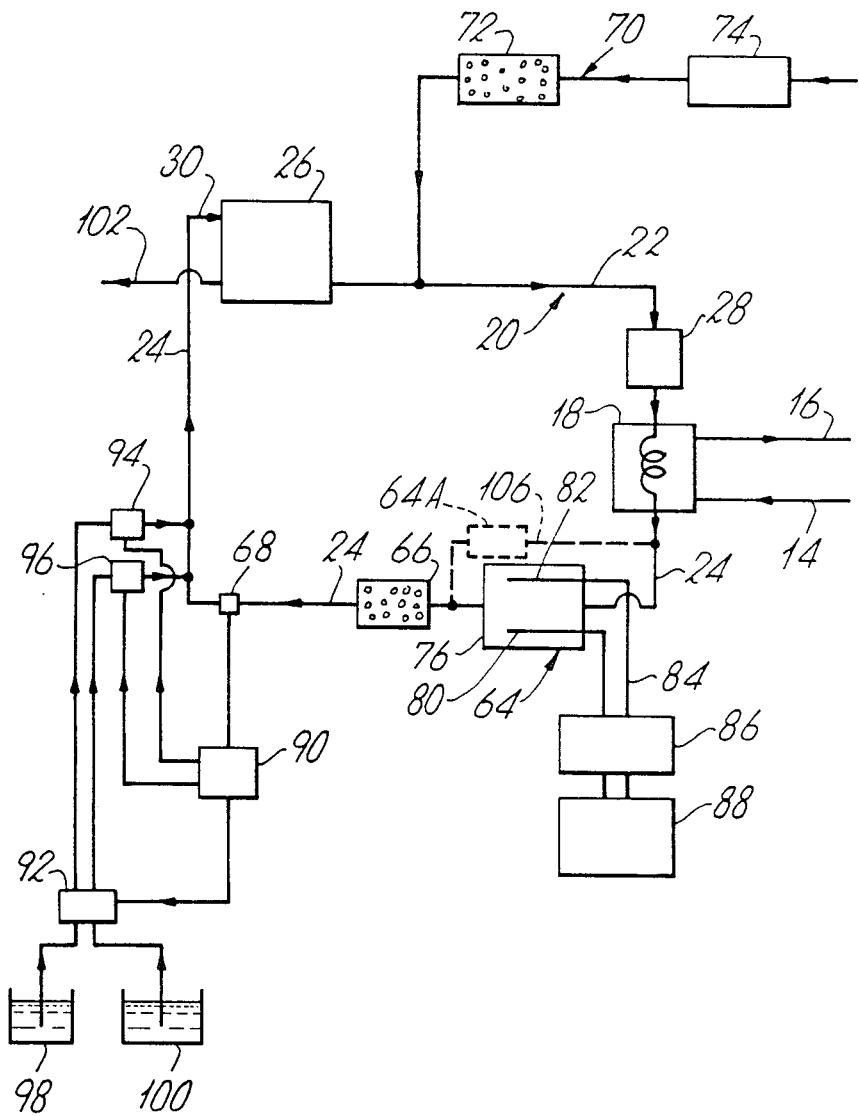
FIG. 4 shows schematically the arrangement of the principal components of the said water recirculating, evaporative cooling apparatus according to the present invention.

In FIG. 4, the water circulation circuit 20 includes in serial relationship a pump 28, a heat exchanger 18, an evaporative cooling unit 26, and—connected in the relatively warm pipework 24 that interconnects the heat exchanger and the cooling unit—a decontaminating unit 64, and ion exchange resin column 66, and a pH monitor 68.

A make-up water supply circuit 70 is connected to the pipe 22 which interconnects the outlet of the cooling unit 26 and the intake of the pump 28, and includes in series relationship a system of ion exchange resin columns 72, and a pre-filter 74.

Figure 5:
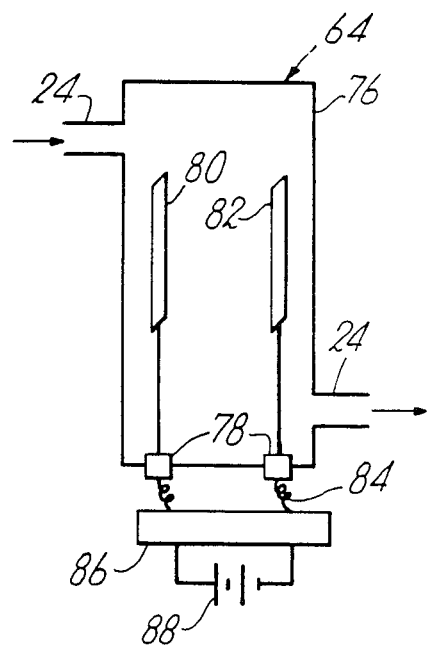
FIG. 5 shows schematically the constructional arrangement an ion releasing means incorporated in the apparatus shown in the FIG. 4.

The decontaminating unit 64 comprises, in its simplest form as shown in the FIG. 5, a chamber 76 through which the water of the circulation circuit 20 passes, and secured in the base of that chamber in electrically-insulating bushings 78 a pair of opposed metal alloy electrodes 80, 82, which are energized through conductors 84 and a polarity reversing switch 86 from a DC supply source 88. The electrodes comprise an alloy of silver, with copper or zinc, or copper and zinc as desired.

The pH monitor 68 supplies its output signal to a control unit 90 which is arranged to control in a closed loop manner an acid/alkali selector valve 92 and a pair of associated pumps 94, 96 whereby to cause as required a corrective injection of an acid from a reservoir 98, or of an alkali from a reservoir 100 as required.

This pH control system is arranged to operate automatically so as to maintain the pH value of the water being circulated around the circulation path 20 in the region of 7.0. The destruction of bacteria and other organisms by the metal ions produced in the chamber 76 appears to be at its best when the circulating water is neutral or slightly acid.

The downstream ion exchange column 66 acts in the manner of a temporary storage device for ions produced in the ionising chamber 76. That column contains ion exchange resin beads (e.g. beads commercially available as SEPHADEX beads) of a pore size suitable for holding silver ions. Ions detach themselves from the resin beads and attach themselves instead to bacteria passing by, the vacant ion sites so created in the resin beads then taking up other ions passing by from the ion releasing chamber. This device ensures close and immediate contact between bacteria and newly formed ions. The construction of this device is similar to that to be described later with reference to the FIG. 6.

In order to maintain the quality of the water circulating around the flow circuit 20, a small proportion of the unevaporated water collected in the outlet of the evaporative cooling unit 26 is bled off via a bleed-off pipe 102. In order to replace that lost water, and to make up for the water lost in evaporation and water droplets, make-up water is admitted to the circulation circuit 20 via the make-up circuit 70. The make-up water is first filtered in the pre-filter 74, and then passes through the ion exchange resin column system 72. The pre-filter may be of the sand bed type where unpressurised large volumes of river water are to be used, or of the cylindrical ceramic "filter candle" type where a lower volume, pressurised supply source is to be used.

The pre-filter 74 is provided wherever the make-up water is turbid or contains a significant amount of organic material, as may be the case with river water, which is frequently used for power station cooling systems. Such a pre-filter extracts from the make-up water suspended particles that would otherwise attract and hold charged silver ions, so preventing such ion from attacking and destroying undesirable bacteria and other organisms.

Depending on the nature of the make-up water supply, that ion exchange system may include, as necessary, separate ion exchange resin columns for removing as required phosphates, sulfides and/or chlorides. Such compounds have been found to have an adverse influence on the effectiveness of the system in killing, damaging and/or preventing from reproducing respiratory disease causing bacteria and other organisms.

Figure 6:
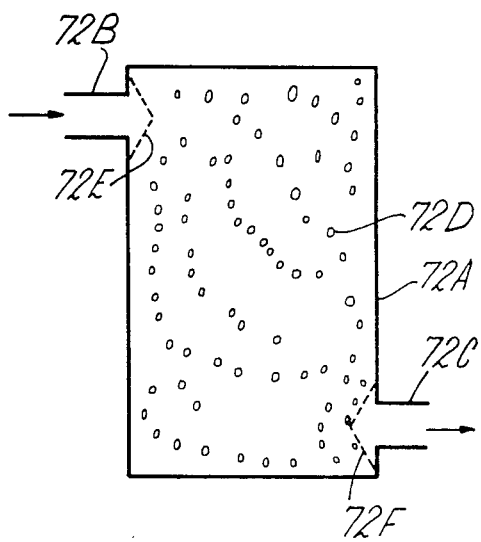
FIG. 6 shows schematically the constructional arrangement of one ion exchange resin column incorporated in the apparatus shown in the FIG. 4.

Each such column is intended to remove one of those three types of compound, and typically comprises as shown in the FIG. 6 a vertical column 72A through which make-up water admitted through an upper port 72B descends to a lower port 72C through a filling 72D of appropriate ion exchange resin beads having an appropriate molecular pore size. Those beads are confined against escape by gauze filters 72E, 72F which cover the inlet and outlet ports. The resin beads may comprise those commerically available in the UK as SEPHADEX beads.

The effectiveness of the system in destroying, or otherwise rendering innocuous, undesirable bacteria and other organisms is adversely affected by the presence of phosphates in the circulating water in concentrations greater than 1/15 of a gram per liter of water. Hence, the need for the phosphate removing ion exchange column where appropriate.

Likewise, sulphides, particularly those of iron and hydrogen, have a similar adverse effect, so that sulphides should be removed from the make-up water so far as possible.

Chlorides also adversely affect system performance when present in concentrations greater than 10 parts per million (by weight), so that likewise where appropriate they should be removed from the make-up water. A separate chloride removal ion exchange column may be used, although if desired chlorides may be removed by the columns provided for removing phosphates and sulfides, by incorporating in them resin beads of appropriate molecular pore size.

The ion exchange resin columns needreplacement in the course of time, when all of the available ion sites become filled.

If desired, a bypass duct as shown in dotted form at 106, may be connected in parallel with the ion release chamber 76, so as to allow the circulation of water around the circuit 20 to continue whilst the flow through that chamber is cut off in order to permit the replacement of the electrodes 80,82. Alternatively, a second and similar decontaminating device 64A may be connected in such a by-pass duct to permit ion release to continue whilst the electrode system in one of the decontaminating devices is replaced.

In the above described apparatus, the decontaminating device 64 should be located as near as possible to, or even in the discharge means 30.

The present invention also finds application in relation to evaporative, water recirculating systems in which the evaporative device (26) has as its primary function the introduction of moisture into a stream of atmospheric air, rather than that of cooling water which has absorbed heat from a heat source. Such an arrangement would be represented schematically by that shown in the FIG. 4, but with the heat exchanger 10 omitted, and the pump 28 delivering water directly to the discharge means 30.

Figure 7:
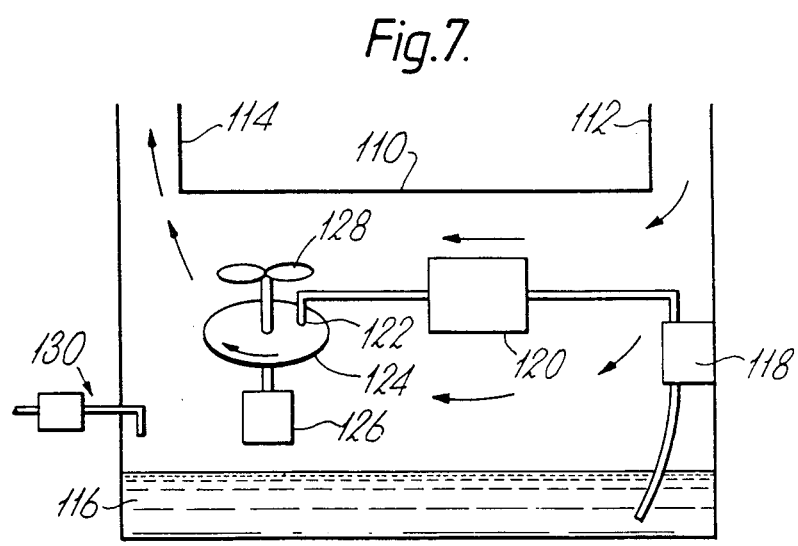
FIG. 7 shows schematically the arrangement of the principal components of a prior art humidifier for humidifying atmospheric air that is to be circulated in a building, which apparatus comprises an evaporative apparatus through which water flows continuously, and in which the water is continuously evaporated in a flow of said atmospheric air.

In the FIG. 7 there is shown schematically the arrangement of a self-contained air humidifying apparatus embodying the present invention. A humidifying chamber 110 has uppermost air inlet and outlet ducts 112, 114, and provides lowermost a collection tray 116 for collecting water for recirculation. A pump 118 draws water from the tray and delivers it through a decontaminating unit 120 to a discharge nozzle 122. That nozzle is arranged to direct the discharging water on to the upper surface of a horizontal disc 124 that is arranged for rotation at high speed about its vertical axis by means of an electric driving motor 126.

A fan 128 mounted above the rotating disc is driven by the motor 126 and creates a flow of air through the humidifying chamber 110.

The decontaminating unit 120 is similar to, and operates in a manner similar to that already described with reference to the earlier figures, so as to kill or otherwise render innocuous respiratory disease causing bacteria and other organisms present in the water being recirculated.

Make-up water is supplied to the humidifying chamber 110 through a make-up circuit 130, which may include as necessary or desirable ion exchange resin columns similar to those already described above, for removing as necessary sulphates, sulphides and/or chlorides.

Impingement of the discharging water on to the disc surface causes the water to be broken up into small droplets which become air borne and thus are carried away by the air flowing out of the outlet duct 114.

Despite the preponderance of pipework systems made of non-metallic materials in modern installations, it has been found surprisingly that, contrary to earlier belief, the ion releasing decontaminating units described above function well and efficiently in metal pipework systems, and without any substantial plating-out on to the interior surfaces of the metal pipework.

We claim:

1. A water recirculating apparatus, comprising:

(a) a water discharge means for discharging water into an evaporation zone through which atmospheric air may flow in contact with said water to thereby effect evaporation therefrom;

(b) means for breaking up the discharging water flow, to thereby increase the free water surface area available for evaporation;

(c) means for causing said flow of atmospheric air through said zone;

(d) collection means for collecting unevaporated water exiting from said zone;

(e) duct means interconnecting said collection means and said discharge means;

(f) pump means connected in said duct means for returning water from said collecting means through said duct means to said discharge means; and (g) ion releasing decontaminating means connected in that part of the apparatus comprising said duct means and said discharge means, for introducing into the water flowing therethrough metal ions including at least silver ions at a release rate sufficient to produce in water leaving the discharge means a predetermined concentration of silver ions sufficient to kill or render innocuous bacteria which cause Legionnaires' disease and related respiratory diseases, thereby to render nondangerous to humans any respiratorily inhaled fine water droplets that escape from the apparatus.

2. An apparatus according to claim 1, wherein:

said ion releasing means comprises a chamber connected in serial manner in said duct means, at least one pair of opposed metal electrode systems spaced apart in said chamber, and means for developing an oscillating electric potential therebetween.

3. An apparatus according to claim 1, further comprising:

an acid reservoir for storing an acid material;

an alkali reservoir for storing an alkali material;

selection valve means for selectively connecting one or the other of said reservoirs with said duct means;

monitoring means connected with said duct means for monitoring the pH value of the water flowing in said duct means and producing an output signal dependent on said pH value; and interconnecting means interconnecting said monitoring means and said selection valve means thereby to cause said selection valve means to respond to said output signal and connect said acid reservoir or said alkali reservoir alternatively to said duct means in response to changes in said pH value relative to a preset value, thereby to automatically admit correcting quantities of an acid material or an alkali material as required into said duct means in a manner such as to maintain in a closed loop manner the monitored pH value substantially at said preset value.

4. An air humidifying apparatus according to claim 1, further comprising:
means for conveying said flow of atmospheric air humidified by water vapor evaporated from said evaporation zone as a humidified air output of the apparatus.

5. An apparatus according to claim 1, wherein:
said decontaminating means is connected in said duct means adjacent to and upstream of said discharge means.

6. An apparatus according to claim 1, wherein:
said duct means includes a main duct and a by-pass duct connected in parallel relationship with said main duct, and wherein said decontaminating means is connected in at least one of said main and auxiliary ducts.

7. An apparatus according to claim 1 wherein:
said duct means comprises a metal duct means.

8. An apparatus according to claim 1 wherein:
said decontaminating means is arranged to introduce into said flowing water ions of at least one of the metals in the group comprising copper and zinc, at a release rate sufficient to produce in water leaving said discharge means, particularly any water escaping the apparatus as fine droplets, a predetermined concentration of ions of that metal sufficient to kill or render innocuous algae, slime mold and other organisms on which the bacteria *Legionalla Pneumophila* depend for nutrition.

9. An apparatus according to claim 1, wherein:
said ion releasing means comprises a chamber connected in serial manner in said duct means, at least one pair of opposed metal electrode systems spaced apart in said chamber, and means for developing a uni-directional electric potential therebetween.

10. An apparatus according to claim 1, further comprising:
a make-up water pipe for supplying make-up water to said apparatus, and means disposed in serial relation with said make-up water pipe, for removing undesirable materials comprising at least one from a group including phosphates, sulfides and chlorides from make-up water flowing therethrough into said apparatus.

11. An apparatus according to claim 10, wherein:
said means for removing said undesirable materials comprises an ion exchange column which incorporates beads of an ion exchange resin adapted to capture said undesirable materials.

12. An apparatus according to claim 1, wherein:
said decontaminating means is connected in said duct means, and including in said duct means downstream of said decontaminating means an ion exchange column which incorporates ion exchange resin beads of a pore size suitable for holding released metal ions in readiness for their attachment to bacteria or other organisms present in the water flowing through that column.

13. An apparatus according to claim 1 further comprising:

a heat source connected in said duct means, from which source heat is to be extracted by water flowing through said duct means, and which heat is to be dissipated from said water by evaporation in said evaporation zone.

14. An apparatus according to claim 13, wherein:
said heat source comprises a water cooling circuit of a steam condensing unit having a steam flow circuit through which steam is passed in contact with said water cooling circuit to transmit heat from said steam to water flowing in said cooling circuit and to thereby condense the steam.

15. An apparatus according to claim 13, wherein:
said heat source comprises a heat exchanger which constitutes part of a refrigeration unit.

16. An apparatus according to claim 15, wherein:
said refrigeration unit constitutes part of an air conditioning unit.

17. An apparatus according to claim 1, wherein:
said means for breaking up the discharging water comprises an impingement surface means against which the discharging water is caused to impinge.

18. An apparatus according to claim 17, wherein:
said impingement surface means comprises a series of spaced, overlapping, mutually-inclined, stationary slats against which said discharging water successively impinges.

19. An apparatus according to claim 1, wherein:
said means for breaking up the discharging water comprises at least one moving solid surface on to which said discharging water is directed by said discharging means.

20. An apparatus according to claim 19, wherein:
said moving surface comprises a surface of a rotating disc.

21. A method of operating a water recirculating apparatus, comprising the steps of:
(a) discharging a recirculating flow of water into an evaporation zone through which atmospheric air passes in contact with the discharging water;
(b) breaking up the flow of discharging water in said zone, thereby to increase the free water surface area available for evaporation;
(c) collecting unevaporated water exiting from said zone and recirculating it for re-use in step (a) above; and
(d) passing the recirculating water before its re-use in said step (a) through an ion releasing chamber and there releasing into the recirculating water silver ions at a release rate to produce in water being discharged into said evaporation zone a concentration of silver ions sufficient to kill or render innocuous, particularly in any fine water droplete that escape from the apparatus, bacteria which may cause Legionnaires' disease and related respiratory disease if said droplets are breathed in by people.

22. A method according to claim 21, further comprising: the steps of supplying make-up water, treating that make-up water so as to remove therefrom undesirable materials comprising at least one from a group including phosphates, sulfides and chlorides, and feeding the treated make-up water into the recirculating water.

23. A method according to claim 21, wherein:
in said ion releasing chamber ions of at least one of the metals copper and zinc are released into said flowing water at a release rate sufficient to produce in water being discharged into said evaporation zone a predetermined concentration of released metal ions sufficient to kill or render innocuous algae, slime mould and other organisms on which the bacteria *Legionella Pneumophila* depend for nutrition.

24. A method according to claim 21, comprising the further steps of:

monitoring deviation from a preset value of the pH value of the water flowing in said duct means; and admitting into said duct means correcting quantities of an acid material or an alkali material in dependence on said deviation and in such a manner as to automatically maintain the monitored pH value substantially at said preset value.

25. A method according to claim 24, wherein:

said pH value is controlled to thereby maintain the water flowing in said duct means neutral or slightly acidic.

26. A method according to claim 21, further comprising:

the steps of supplying make-up water, treating that make-up water so as to substantially remove therefrom undesirable materials comprising at least one from a group including phosphates, sulfides and chlorides, and feeding the treated make-up water into the recirculating water.

27. A method according to claim 26, wherein:

the phosphate concentration in the recirculating water is maintained at less than 1/15 gram per liter of water.

28. A method according to claim 26, wherein:

the chloride concentration in the recirculating water is maintained at less than 10 parts per million.

29. A method according to claim 26, wherein:

the sulfides in the recirculating water are reduced to the lowest extent possible.

* * * * *